United States Patent
Teboulle

(10) Patent No.: US 10,982,990 B2
(45) Date of Patent: Apr. 20, 2021

(54) METHOD OF MEASURING SPEED OF FLUID BY APPLYING AN EXCITATION SIGNAL COMPRISING A FIRST PORTION HAVING A DECREASING AMPLITUDE FOLLOWED BY A SECOND PORTION OF CONSTANT AMPLITUDE

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

(*) Notice: Subject to any disclaimer, the term of this patent is extended or adjusted under 35 U.S.C. 154(b) by 0 days.

(21) Appl. No.: 16/760,833

(22) PCT Filed: Dec. 7, 2018

(86) PCT No.: PCT/EP2018/084044
§ 371 (c)(1),
(2) Date: Apr. 30, 2020

(87) PCT Pub. No.: WO2019/110827
PCT Pub. Date: Jun. 13, 2019

(65) Prior Publication Data
US 2020/0378820 A1    Dec. 3, 2020

(30) Foreign Application Priority Data
Dec. 8, 2017   (FR) ..................... 1761873

(51) Int. Cl.
*G01F 25/00* (2006.01)
*G01F 1/66* (2006.01)

(52) U.S. Cl.
CPC .......... *G01F 25/0007* (2013.01); *G01F 1/662* (2013.01); *G01F 1/667* (2013.01)

(58) Field of Classification Search
None
See application file for complete search history.

(56) References Cited

U.S. PATENT DOCUMENTS

| 4,515,021 A | 5/1985 | Wallace et al. |
| 2017/0227568 A1 | 8/2017 | Hies et al. |

FOREIGN PATENT DOCUMENTS

| FR | 2260229 A1 | 8/1975 | |
| WO | WO9746854 A1 | 12/1997 | |
| WO | WO-2017019016 A1 * | 2/2017 | ........... G01F 25/007 |

* cited by examiner

*Primary Examiner* — Harshad R Patel
(74) *Attorney, Agent, or Firm* — Muncy, Geissler, Olds & Lowe, P.C.

(57) ABSTRACT

Method for measuring a speed of a fluid and ultrasound fluid meter suitable for implementing this method. The method comprises the step of measuring a travel time taken by a measurement ultrasound signal to travel a path of defined length, the measurement ultrasound signal being generated by a transducer subjected to an excitation electrical signal (16). The excitation electrical signal (16) includes a first signal portion (17) followed by a second signal portion (18). The first signal portion is a periodic signal having a pattern (19) and a decreasing amplitude. The second signal portion is a periodic signal having the same pattern (21) and a constant amplitude.

11 Claims, 4 Drawing Sheets

METHOD OF MEASURING SPEED OF FLUID BY APPLYING AN EXCITATION SIGNAL COMPRISING A FIRST PORTION HAVING A DECREASING AMPLITUDE FOLLOWED BY A SECOND PORTION OF CONSTANT AMPLITUDE

The invention relates to the field of methods of measuring a fluid speed.

BACKGROUND OF THE INVENTION

In order to measure a flow rate of a fluid flowing in a pipe, an ultrasonic flow meter conventionally makes use of a device for measuring the speed of the fluid by emitting and receiving ultrasound measurement signals.

The measurement device includes a duct connected to the pipe in which the fluid flows. In order to measure the speed of the fluid, an ultrasound measurement signal is emitted into the duct to travel along a path of defined length, the travel times taken by the ultrasound measurement signal to travel along the path of defined length both from upstream to downstream and from downstream to upstream are measured, and also the speed of the fluid is estimated on the basis in particular of the defined length and of the difference between the travel times.

Such a measurement device 1, sometimes referred to as a "classical pipe" device, is shown in FIG. 1. The measurement device 1 comprises a first transducer 2a, a second transducer 2b, and a measurement module 3 connected to the first transducer 2a and to the second transducer 2b.

The first transducer 2a and the second transducer 2b are paired in terms of frequency and emission level. By way of example, the first transducer 2a and the second transducer 2b are piezoelectric transducers.

The path of defined length is thus a rectilinear path of length L between the first transducer 2a and the second transducer 2b.

The measurement module 3 produces an electrical excitation signal 4 is applied as input to the first transducer 2a.

On the basis of the electrical excitation signal 4, the first transducer 2a emits an ultrasound measurement signal 5. The second transducer 2b receives a received ultrasound measurement signal 6 resulting from the ultrasound measurement signal 5 propagating in the fluid.

The measurement module 3 measures the travel time taken by the ultrasound measurement signal 5 to travel along the path of defined length from upstream to downstream.

In reality, the measurement module 3 measures a global transfer time $T_{AB}$ from the first transducer 2a to the second transducer 2b.

The global transfer time $T_{AB}$ is such that:

$$T_{AB} = TA_A + ToF_{AB} + TR_B, \text{ where:}$$

$TA_A$ is a switch-on time of the first transducer 2a;

$ToF_{AB}$ corresponds to the time of flight taken by the ultrasound measurement signal 5 to travel along the path of defined length between the first transducer 2a and the second transducer 2b; and $TR_B$ is a reception time of the second transducer 2b.

Likewise, the second transducer 2b emits an ultrasound measurement signal that is received by the first transducer 2a.

The global transfer time $T_{BA}$ is such that:

$$T_{BA} = TA_B + ToF_{BA} + TR_A, \text{ where:}$$

$TA_B$ is a switch-on time of the second transducer 2b;

$ToF_{BA}$ corresponds to the time of flight taken by the ultrasound measurement signal to travel along the path of defined length between the second transducer 2b and the first transducer 2a; and $TR_A$ is a reception time of the first transducer 2a.

Assuming that:

$$TA_A = TA_B \text{ and } TR_A = TR_B, \text{ then:}$$

$$\Delta T = TBA - TAB = ToF_{BA} - ToF_{AB} = DToF$$

where DToF is the differential time of flight.

However, the DToF is proportional to the mean speed $\bar{V}$ of the fluid, and the measurement module 3 then calculates the mean speed $\bar{V}$ of the fluid using the following formula: $DToF = 2L \cdot \bar{V}/(C^2 - V^2)$, where C is the speed of an ultrasound wave in the fluid. For example, the speed of an ultrasound wave in water is equal to approximately 1500 meters per second (m/s), and it depends on the temperature of the water.

The measurement model 3 then deduces the flow rate of the fluid flowing in the pipe from the signed mean speed $\bar{V}$.

OBJECT OF THE INVENTION

An object of the invention is to improve flow rate measurements taken by an ultrasonic fluid meter and to reduce the amount of electricity that needs to be consumed in order to take such measurements.

SUMMARY OF THE INVENTION

In order to achieve this object, there is provided a method of measuring a fluid speed, the method comprising the step of measuring a travel time taken by an ultrasound measurement signal to travel along a path of defined length, the ultrasound measurement signal being generated by a transducer that is subjected to an electrical excitation signal. According to the invention, the electrical excitation signal comprises a first signal portion followed by a second signal portion, the first signal portion being a periodic signal presenting a pattern having a maximum amplitude that decreases, and the second signal portion being a periodic signal having the same pattern with a maximum amplitude that is constant.

By means of the above-described electrical excitation signal, the ultrasound measurement signal as received after travelling along the path presents lobes that are almost identical.

The fact of having lobes that are almost identical facilitates taking speed measurements and increases the accuracy of those speed measurements (and thus of flow rate measurements). Furthermore, this makes it possible to use the initial lobes of received ultrasound measurement signals in order to take travel time measurements, thereby making it possible to reduce the amount of electricity that needs to be consumed in order to take the speed measurements.

There is also provided an ultrasonic fluid meter comprising a first transducer, a second transducer, and a measurement module connected to the first transducer and to the second transducer, the ultrasonic fluid meter being arranged to perform the measurement method as described above.

There is also provided a computer program including instructions for enabling a microcontroller of an ultrasonic fluid meter to perform the measurement method as described above.

There are also provided storage means that store a computer program including instructions for enabling a microcontroller of an ultrasonic fluid meter to perform the measurement method as described above.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
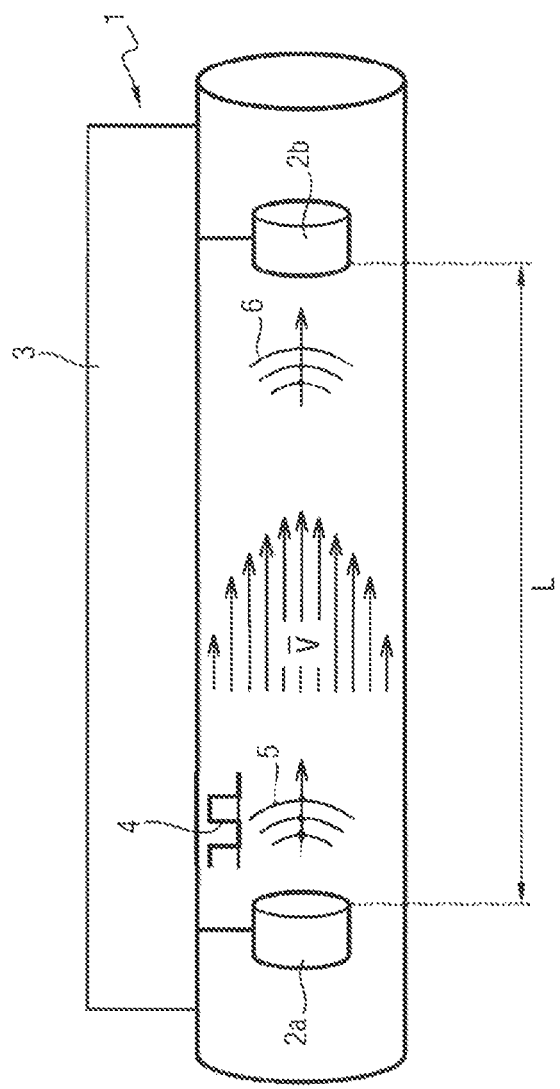
FIG. 1 shows a prior art ultrasonic fluid meter.
Figure 2:
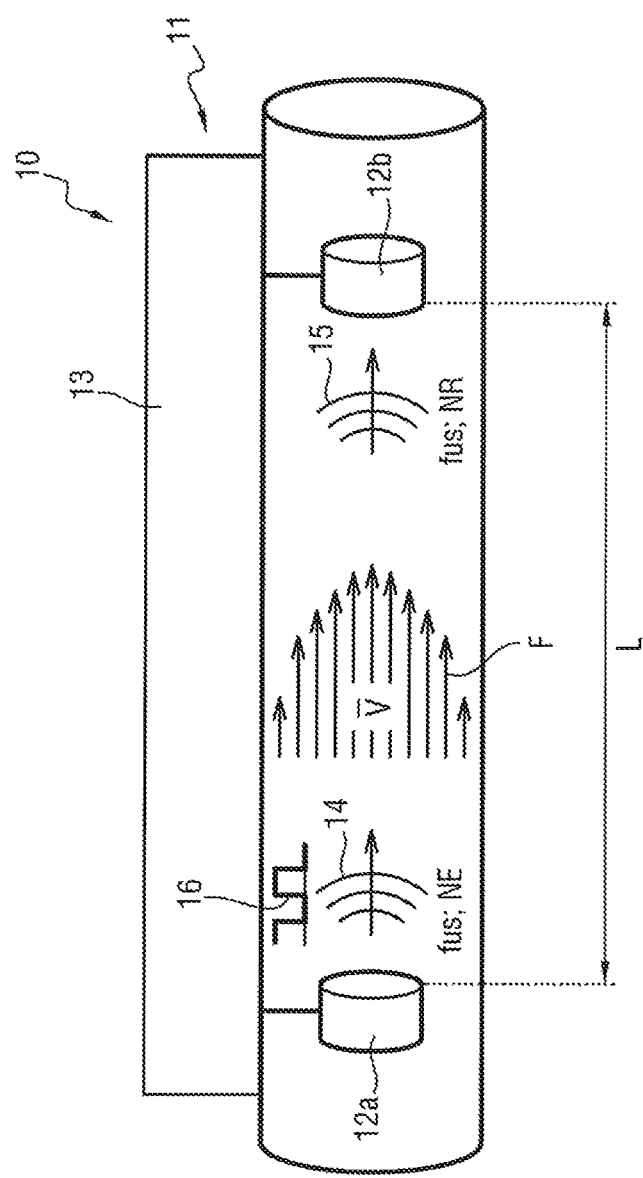
FIG. 2 shows an ultrasonic fluid meter in which the measurement method of the invention is performed.

With reference to FIG. 2, the method of the invention for measuring a fluid speed is performed in this example in an ultrasonic water meter.

The ultrasound water meter 10 comprises both a duct through which water flows on being delivered by a distribution network to an installation, and also a water speed measurement device 11.

Water flows in the duct from upstream to downstream, as represented by the direction of arrows F, however it could equally well flow from downstream to upstream.

The measurement device 11 comprises a first transducer 12a, a second transducer 12b, and a measurement module 13 connected to the first transducer 12a and to the second transducer 12b.

The first transducer 12a and the second transducer 12b are paired. In this example, the first transducer 12a and the second transducer 12b are piezoelectric transducers.

The measurement module 13 includes a processor component adapted to execute instructions of a program for performing the measurement method of the invention. Specifically, the processor component is a microcontroller, but it could be some other component, e.g. a processor or a field programmable gate array (FPGA).

The measurement module 13 controls the first transducer 12a and the second transducer 12b.

Each of the first and second transducers 12a and 12b performs in succession the function of an emitter of ultrasound measurement signals 14 and the function of a receiver of received ultrasound measurement signals 15.

The measurement module 13 generates electrical excitation signals 16 and delivers the electrical excitation signals 16 to the emitter.

The emitter transforms each electrical excitation signal 16 into an ultrasound measurement signal 14. The measurement module 13 acquires the received ultrasound measurement signals 15, which are received by the receiver.

The emitter emits the ultrasound measurement signals 14 at an emission frequency fus. The frequency fus conventionally lies in the range 900 kilo hertz (kHz) to 4 megahertz (MHz), and in this example it is equal to 1 MHz.

The ultrasound measurement signals 14 thus travel from upstream to downstream and from downstream to upstream along a path of defined length L between the first transducer 12a and the second transducer 12b. In this example, the path of defined length is a rectilinear path between the first transducer 12a and the second transducer 12b.

In FIG. 2, the first transducer 12a is shown as performing the function of an emitter, and the second transducer 12b is shown as performing the function of a receiver. The electrical excitation signal 16 is thus applied as input to the first transducer 12a in order to emit the ultrasound measurement signal 14. The ultrasound measurement signal 14 thus follows the path of defined length L from upstream to downstream. The ultrasound measurement signal 14 is emitted by the emitter at a level NE. The received ultrasound measurement signal 15 is received by the receiver at a level NR that is lower than the level NE.

The measurement module 13 produces a travel time measurement representative of the time taken by the ultrasound measurement signal 14 to travel along the path of defined length of L from upstream to downstream, and then produces a travel time measurement representative of the time taken by the ultrasound measurement signal 14 to travel along the path of defined length L from downstream to upstream, and finally evaluates the speed of the water as a function of these travel time measurements.

Figure 3:
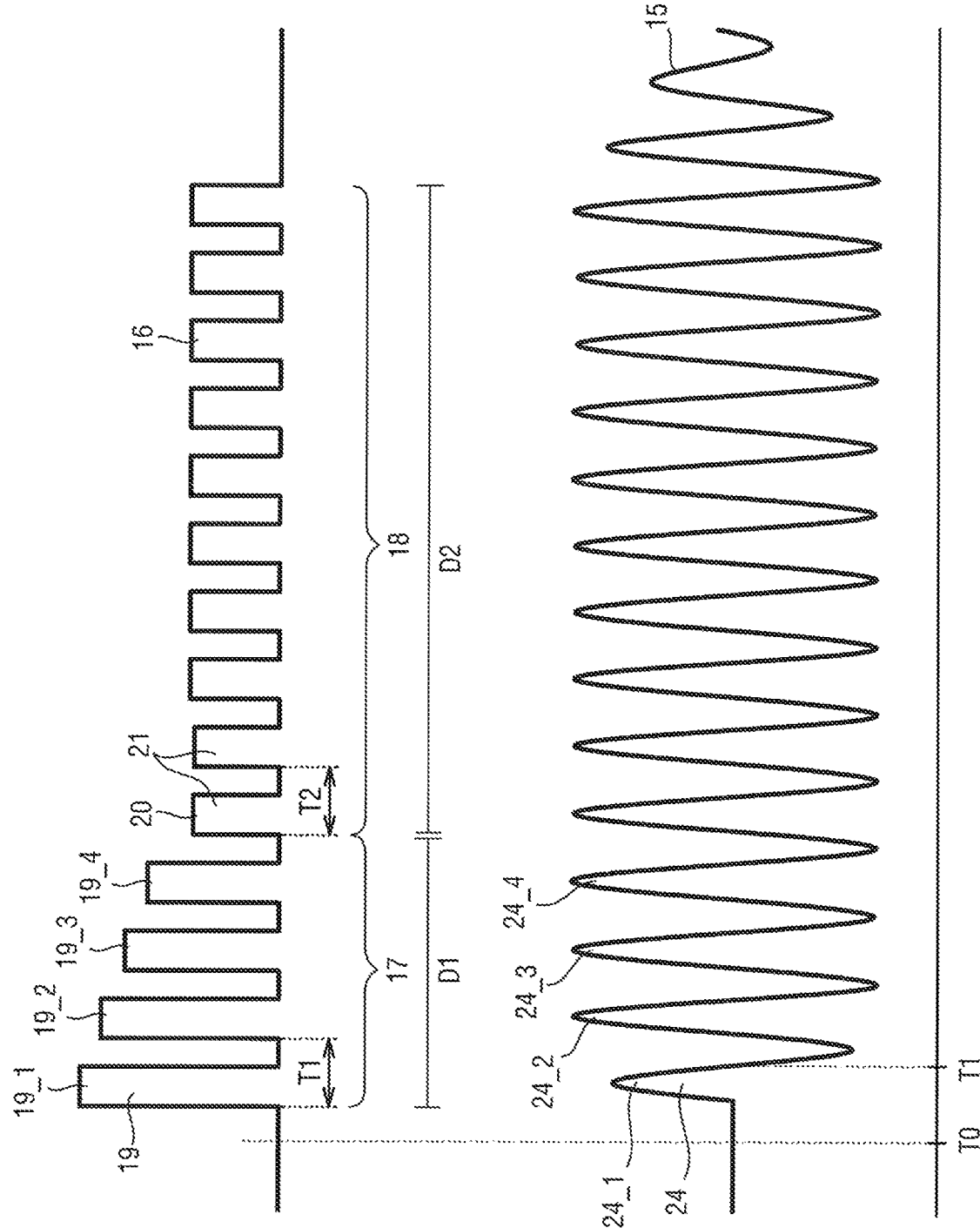
FIG. 3 shows a received ultrasound measurement signal and an electrical excitation signal use while performing the measurement method of the invention.

With reference to FIG. 3, there follows a description of the electrical excitation signal 16.

The electrical excitation signal 16 comprises a first signal portion 17 followed by a second signal portion 18.

The first signal portion 17 is a periodic signal presenting a pattern 19 that is repeated periodically with a first period T1 and having a maximum amplitude that decreases. The first signal portion 17 is a rectangular signal. The pattern 19 of the first signal portion 17 is thus a rectangle. The pattern 19 may also be referred to as a "squarewave" signal.

In this example, the first signal portion 17 has four patterns 19: a first pattern 19_1, a second pattern 19_2, a third pattern 19_3, and a fourth pattern 19_4.

The first signal portion 17 has a first duration D1, which is therefore equal to four times the first period T1.

In this example, since each pattern 19 is a rectangle, the maximum amplitude of a pattern 19 is the amplitude of the high state of the pattern 19.

The maximum amplitude of the pattern 19 of the first signal portion 17 decreases in accordance with a linear function.

The term "function" is used herein to mean a relationship that, for a given moment of arrival or a given order number of arrival in the pattern, associates a pattern with a value for the maximum amplitude of the pattern.

In this example, the first pattern 19_1 has a maximum amplitude equal to 3 volts (V). The second pattern 19_2 has a maximum amplitude equal to 2.75 V. The third pattern 19_3 has a maximum amplitude equal to 2.5 V. The fourth pattern 19_4 has a maximum amplitude equal to 2.25 V. The pattern 20 that follows the fourth pattern 19_4 and that is the first pattern of the second signal portion 18 has a maximum amplitude equal to 2 V.

The second signal portion 18 is a periodic signal presenting a pattern 21 is repeated periodically with a second period T2 and that has a maximum amplitude that is constant. Naturally, the term "maximum amplitude that is constant" is used to cover a maximum amplitude that might possibly vary, but with variations of small amplitude only, e.g. lying in the range 1% to 5% of the mean maximum amplitude of the pattern 21.

The second period T2 is equal to the first period T1. The second signal portion 18 is a rectangular signal. The pattern 21 of the second signal portion 18 is thus a rectangle.

The second signal portion 18 has a larger number of patterns 21, such that a second duration D2 of the second signal portion 18 is longer than the first duration D1 of the first signal portion 17.

In this example, the first signal portion 17 constitutes a starting portion of the electrical excitation signal 16, while the second signal portion 18 extends from the end of this starting portion to the end of the electrical excitation signal 16, the electrical excitation signal 16 serving to obtain a travel time measurement representative of the time taken by the ultrasound measurement signal 14 to travel along the path of defined length L from upstream to downstream.

The receiver (i.e. the second transducer 12b in FIG. 2) activates reception of the received ultrasound measurement signal 15 at a moment T0 that is synchronized with the emission of the ultrasound measurement signal 14. This synchronization is made possible by pairing the emitter and the receiver.

It should be observed that the received ultrasound measurement signal 15 presents an ultrasound waveform that is almost perfectly sinusoidal. In particular, it should be observed that the first four lobes 24 of the received ultrasound measurement signal 15, corresponding to the patterns 19 of the first signal portion 17 of the electrical excitation signal 16, present an amplitude that is almost equal to the amplitude of the other lobes of the received ultrasound measurement signal 15.

The upstream to downstream travel time is measured on the basis of determining a moment of arrival T1 for a predetermined lobe of the received ultrasound measurement signal 15.

In this example, the moment of arrival T1 is the instant at which a falling edge of the predetermined lobe arrives. The moment of arrival T1 is measured by a zero crossing type method.

Since the received ultrasound measurement signal 15 presents an ultrasound waveform of that is almost perfectly sinusoidal, it is possible to choose the first low 24_1 of the received ultrasound measurement signal 15 as the predetermined lobe. Naturally, some other lobe could be chosen, e.g. the second lobe 24_2, the third lobe 24_3, or the fourth lobe 24_4.

An electrical excitation signal similar to electrical excitation signal 16 is then applied by the measurement module 13 to the input of the second transducer 12b. A received ultrasound measurement signal similar to the received ultrasound measurement signal 15 is then received by the measurement module 13 after travelling along the path of defined length L from downstream to upstream.

The downstream to upstream travel time is measured on the basis of determining a moment of arrival T1 for a predetermined lobe of said received ultrasound measurement signal.

The speed of the water is then evaluated by the measurement module 13 as a function of an upstream to downstream travel time measurement and of a downstream to upstream travel time measurement.

The speed of the water is proportional to a difference between the downstream to upstream travel time measurement and the upstream to downstream travel time measurement.

It should be observed that the measured speed of the water is an average speed for the water across the diameter of the duct, given that the speeds of masses of water differ from the center of the duct to the proximity of the walls of the duct.

It should also be observed that temperature compensation is performed, since the speed of sound in water varies as a function of the temperature of the water (this also applies to other fluids, e.g. to gas or to oil).

Figure 4:
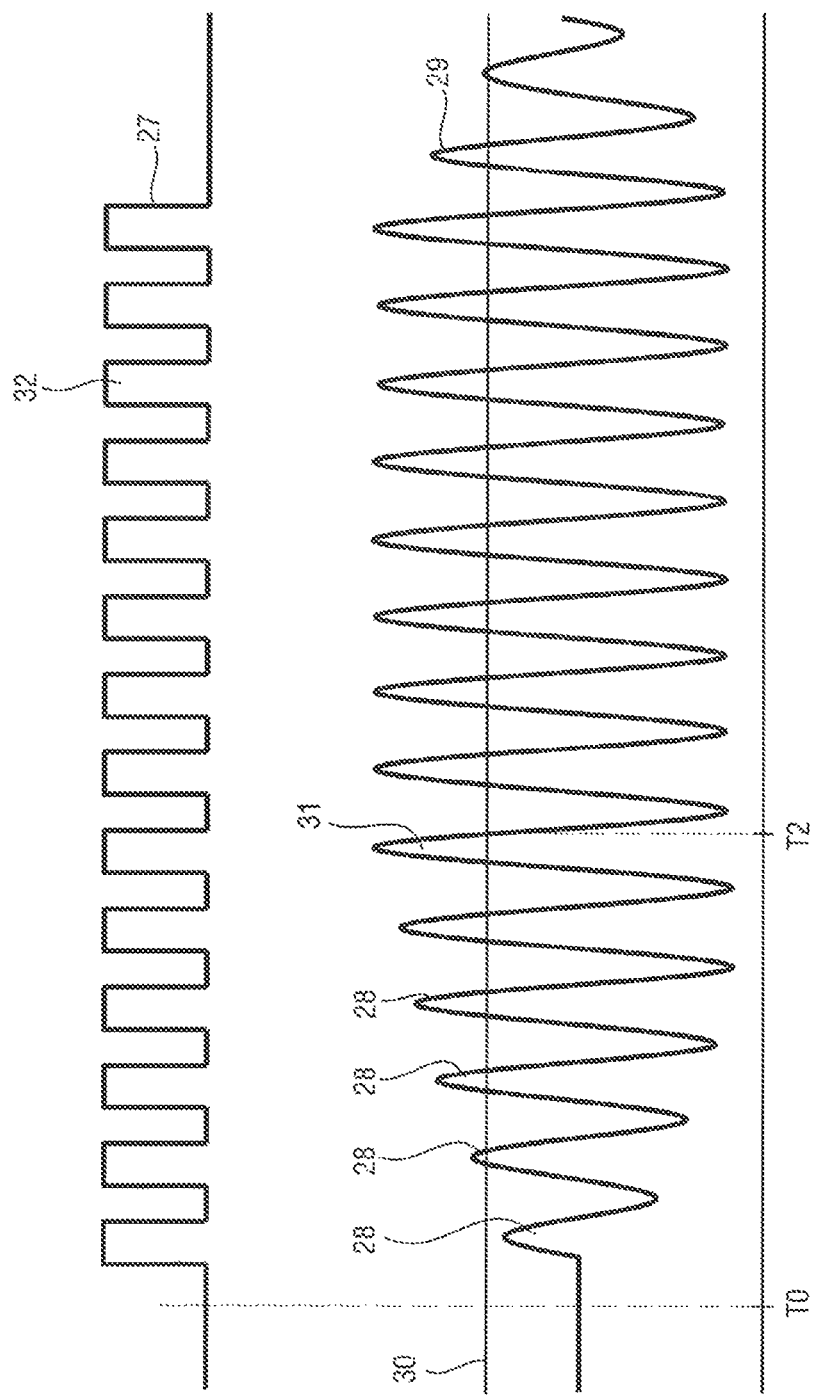
FIG. 4 shows a received ultrasound measurement signal and an electrical excitation signal use while performing a prior art measurement method.

With reference to FIG. 4, there follows an observation of the situation when the electrical excitation signal 27 is a simple rectangular signal in which the patterns 32 are of amplitude that is constant. Under such circumstances, it can be seen that the first lobes 28 of the received ultrasound measurement signal 29 present a smaller amplitude that increases progressively.

The membrane of the piezoelectric transducer 12a or 12b that is used as the emitter constitutes an oscillator that is excited by an electrical excitation signal.

The increasing amplitude of the initial lobes 28 of the received ultrasound measurement signal 29 is due to transient conditions in which the oscillator is to be found when it starts to be excited by the electrical excitation signal 27. The transient conditions precede steady conditions that correspond to the subsequent lobes of the received ultrasound measurement signal 29.

The initial lobes 28 thus present an amplitude that is small and not constant, and that are therefore difficult to use with the zero crossing method.

The upstream to downstream travel time is measured on the basis of determining a moment of arrival T2 for a predetermined lobe of the received ultrasound measurement signal 29, which is therefore not one of the initial lobes 28.

In order to ensure satisfactory measurement, it is necessary to select as the predetermined lobe a lobe for which it is certain that its amplitude does not correspond to transient conditions, but rather to steady sinusoidal conditions. By way of example, it could be the fourth lobe of the received ultrasound measurement signal 29 that is selected, such that the received ultrasound measurement signal presents an amplitude that exceeds a predetermined amplitude threshold 30. In this example it is the lobe 31, which is the sixth lobe of the received ultrasound measurement signal 29. The upstream to downstream travel time is measured from the determination of an arrival moment T2.

The initial lobes 28 are thus not used.

In contrast, by performing the measurement method of the invention, it is possible to use the first lobe 24_1 (or one of the first lobes) of the received ultrasound measurement signal 15.

The fact of having lobes that are almost identical makes measurement easier and thus increases measurement accuracy. Furthermore, since it is possible to use the first lobe 24_1, or one of the first lobes, the measurements are taken more quickly, thus making it possible to reduce the consumption of electricity associated with taking measurements.

It should be observed that the values for the maximum amplitudes of the patterns 19 of the first signal portion 17 can be defined while designing the measurement device 11 of the ultrasound water meter 10.

The values for the maximum amplitudes of the patterns 19 of the first signal portion 17 can also be defined during a step of calibrating the measurement device 11. The maximum amplitude values are then included in a table stored in a memory of the measurement device 11. By way of example, the calibration step may be performed when the measurement device 11 is manufactured.

Naturally, the invention is not limited to the embodiment described, but covers any variant coming within the ambit of the invention as defined by the claims.

It is naturally possible to cause the maximum amplitude of the pattern of the first signal portion to decrease in accordance with some other function.

By way of example, the maximum amplitude of the pattern of the first signal portion may decrease in accordance with the following function:

$$y = \frac{a}{b + c \cdot N};$$

where y is the maximum amplitude for a pattern of the first signal portion, N is the number of said pattern starting from a first pattern of the first signal portion, and a, b, and c are constants.

By way of example, it is possible to select a=3, b=7/8, and c=1/8.

The first pattern then presents a maximum amplitude equal to 3 V. The second pattern presents a maximum amplitude equal to 2.67 V. The third pattern presents a maximum amplitude equal to 2.4 V. The fourth pattern presents a maximum amplitude equal to 2.18 V. The first pattern of the second signal portion presents a maximum amplitude equal to 2 V.

It is also be possible to define constant and arbitrary decreasing values for the pattern 19. Under such circumstances, the maximum amplitude of the pattern of the first signal portion decreases with determined discrete values.

Naturally, the first signal portion could have a number of patterns other than four.

It is stated above that the first signal portion is followed by the second signal portion. The term "followed" does not necessarily mean "followed immediately": there could be a third signal portion between the first signal portion and the second signal portion. Likewise, the first signal portion could be preceded by a fourth signal portion, and the second signal portion could be followed by a fifth signal portion.

Above the pattern is described as being rectangular, however the pattern could be different: triangular, sawtooth, sinusoidal, etc.

Naturally, the invention applies regardless of the positioning and the configuration of the first transducer and of the second transducer. The ultrasound measurement signals may be emitted in a direction that is at an angle that is arbitrary relative to a longitudinal axis of the duct. The ultrasound measurement signals may be reflected by reflectors, e.g. by mirrors oriented at 45°.

The invention may also be used to measure the speed of some other fluid, e.g. of gas, or oil, etc.

The invention claimed is:

1. A measurement method for measuring a fluid speed, the method comprising:
   measuring a travel time taken by an ultrasound measurement signal to travel along a path of a defined length, the ultrasound measurement signal being generated by a transducer that is subjected to an electrical excitation signal,
   wherein the electrical excitation signal comprises a first signal portion followed by a second signal portion, the first signal portion being a periodic signal presenting a pattern having a maximum amplitude that decreases, and the second signal portion being a periodic signal having the same pattern with a maximum amplitude that is constant.

2. The measurement method according to claim 1, wherein the maximum amplitude of the pattern of the first signal portion decreases in accordance with a linear function.

3. The measurement method according to claim 1, wherein the maximum amplitude of the pattern of the first signal portion decreases in accordance with a function of the type:

$$y = \frac{a}{b + c \cdot N},$$

where y is the maximum amplitude for the pattern of the first signal portion, N is a number of the pattern starting from a first pattern of the first signal portion, and a, b, and c are constants.

4. The measurement method according to claim 3, wherein a=3, b=7/8, and c=1/8.

5. The measurement method according to claim 1, wherein the maximum amplitude of the pattern of the first signal portion decreases with determined discrete values.

6. The measurement method according to claim 1, wherein the electrical excitation signal is a rectangular signal.

7. The measurement method according to claim 1, wherein the maximum amplitude of the pattern of the first signal portion lies in a range 3 V to 2 V, and the maximum amplitude of the pattern of the second signal portion is equal to 2 V.

8. The measurement method according to claim 1, wherein the transducer is a piezoelectric transducer.

9. The measurement method according to claim 1, wherein the measurement method is performed in a measurement device, the measurement method further comprises a step of calibrating the measurement device comprising defining maximum amplitude values for the patterns of the first signal portion and including the maximum amplitude values in a table stored in a memory of the measurement device.

10. The measurement method according to claim 9, wherein the calibration step is performed when manufacturing of the measurement device.

11. An ultrasonic fluid meter comprising a first transducer, a second transducer, and a measurement module connected to the first transducer and to the second transducer, the ultrasonic fluid meter being arranged to perform the measurement method according to claim 1.

* * * * *